United States Patent Office 3,201,486
Patented Aug. 17, 1965

3,201,486
ALKYLATION OF ALKYLATABLE ORGANIC COMPOUNDS
Mitchell S. Bielawski, Mount Prospect, and Julian M. Mavity, Palatine, Ill., assignors to Universal Oil Products Company, Des Plaines, Ill., a corporation of Delaware
No Drawing. Filed Dec. 19, 1960, Ser. No. 76,491
12 Claims. (Cl. 260—671)

This application is a continuation-in-part of our copending application Serial No. 766,673 filed October 13, 1958, now abandoned.

This invention relates to a process for alkylating alkylatable organic compounds and particularly to a process for alkylating aromatic compounds. More particularly the invention is concerned with a process for alkylating alkylatable aromatic compounds containing a replaceable hydrogen atom in the presence of a solid alkylation catalyst.

The recent introduction of automobile engines of high compression ratio and the increasing number of airline flights with a corresponding increase in the consumption of aviation gasoline has led to the need for the utilization of processes in the petroleum refining industry for the production of extremely high anti-knock hydrocarbons as fuels, said fuels being suitable for use in airplane engines and the aforesaid automobile engines having high compression ratios. One such process for the production of hydrocarbons having high anti-knock values is the catalytic alkylation of aromatic hydrocarbons with olefins. In this alkylation process various catalytic agents have been suggested including concentrated sulfuric acid and liquid hydrogen fluoride. However, the aforesaid catalysts have certain disadvantages in their use inasmuch as both of the acids are extremely corrosive and must be handled with a maximum of care. In addition, other alkylated aromatic compounds which may be prepared according to the process of this invention are useful per se or as intermediates in the production of plastics, resins and other organic materials. Ethylbenzene, which results from the alkylation of benzene with ethylene, is in large demand for dehydrogenation of styrene, one starting material for the production of some synthetic rubber. For example, an aromatic compound such as benzene may be alkylated with an olefinic hydrocarbon such as propylene to form cumene which may then be oxidized to form cumene hydroperoxide. The latter compound may then be decomposed to form phenol and acetone, both of which are important chemical compounds. Furthermore, an aromatic compound such as p-cresol may be alkylated with isobutylene to form 2,6-di-butyl-4-methylphenol, a very effective antioxidant for preventing the deterioration of organic substances due to oxygen. As hereinbefore stated, numerous catalysts have been proposed to effect the condensation reactions including liquid catalysts such as phosphoric acid, etc., which are in addition to the aforementioned sulfuric acid and hydrogen fluoride; and solid catalysts such as aluminum chloride, aluminum bromide, metal oxides, metal sulfides, clays, etc. However, each of the perior art catalysts has suffered from at least one inherent disadvantage. It is, therefore, an object of this invention to provide a catalyst which can be used in systems and/or reactions where prior art catalysts are unsatisfactory, the use of said catalyst overcoming disadvantages which are well-known to one skilled in the art.

Hereto fore Solid Phosphoric Acid catalysts which have been used for promoting condensation reactions have been produced by mixing a siliceous adsorbent with an oxygen acid of phosphorus in such proportions that the weight ratio of $P_2O_5$ to siliceous adsorbent of the resultant composite would be about 2. Such a composite was then calcined at a temperature of from about 260° to about 430° C., the calcined catalyst then generally containing about 60 to about 65% by weight of total $P_2O_5$. The catalysts so formed are active condensation catalysts and have a crushing strength generally of from about 10 to about 20 pounds when freshly prepared but have a tendency to deteriorate by softening during use. In addition it has also been found necessary that in order to maintain a high activity of these catalysts it is necessary to add a certain low portion of water vapor as stem to the charge stock in order to decrease the amounts of moisture which is lost by the catalyst during use inasmuch as excess dehydration of the catalyst results in a lowering of catalyst activity which is also accompanied by deposition of the catalyst of heavy hydrocarbonaceous materials having the appearance of tar.

It is a well-known fact that commercial Solid Phosphoric Acid catalysts had very good activities when calcined at a temperature in the neighborhood of about 370° C.; however, these catalysts suffered a very undesirable loss of crushing strength during use. In addition it is also a well-known fact that substantially higher calcination temperatures, e.g., 460° C., improved the crushing strengths to a certain extent but also had a serious drawback in that this calcination temperature seriously impaired the activities of the catalyst. It has now been found however, that if the phosphoric acid content of a silicophosphoric acid catalyst is raised considerably above the concentration which has heretofore been used in commercial Solid Phosphoric Acid catalysts, so that the resulting composite contains above 75% by weight of the phosphoric acid prior to calcination, hereinafter referred to as having from 75 to 90% by weight of an oxygen acid of phosphorus, and also, if the calcination temperature is increased so that it is above about 460° C. and preferably from about 540° to about 900° C. (temperatures at which it would generally be assumed theretofore that very serious catalyst deactivation would occur), a silicophosphoric acid catalyst will result having a considerably higher condensation or alkylation activity than that of the previously used commercial catalyst and also will have a greater resistance to deterioration during use because of its unusually high crushing strength.

It is therefore an object of this invention to provide a process for alkylating an alkylatable organic compound with an alkylating agent in the presence of a Solid Phosphoric Acid catalyst having relatively high activity and relatively high after use crushing strength.

A further object of this invention is to provide a process for obtaining higher yields of alkylated organic compounds by alkylating said compounds with an alkylating agent in the presence of a Solid Phosphoric Acid catalyst having a high $P_2O_5$ content and that has been calcined at a high temperature above about 540° C.

One embodiment of this invention resides in a process for the alkylation of an alkylatable aromatic compound containing a replaceable hydrogen atom which comprises condensing said compound with an olefin-acting alkylating agent at a temperature in the range of from about room temperature to about 400° C. and at a pressure in the range of from about atmospheric to about 100 atmospheres in the presence of a catalyst consisting of a mixture of from about 25 to about 10% by weight of a siliceous adsorbent and from about 75 to about 90% by weight of an oxygen acid of phosphorus having a $P_2O_5$ content of from about 79 to about 85 weight percent, said mixture having been calcined at a temperature in the range of from about 550° to about 900° C., said catalyst being characterized by containing a predominant proportion of crystalline form C, the characteristics of said form being fully set forth hereinafter in the following specification.

A further embodiment of this invention is found in a process for the alkylation of an alkylatable aromatic hydrocarbon containing a replaceable hydrogen atom which comprises condensing said compound with an olefinic alkylating agent at a temperature in the range of from about room temperature to about 400° C. and at a pressure in the range of from about atmospheric to about 100 atmospheres in the presence of a catalyst consisting of a mixture of from about 25 to about 18% by weight of a siliceous adsorbent and from about 75 to about 82% by weight of an oxygen acid of phosphorus having a $P_2O_5$ content of from about 79 to about 85 weight percent, said mixture having been calcined at a temperature in the range of from about 550° to about 900° C., said catalyst containing a mole ratio of $P_2O_5$ to $SiO_2$ in the range of from about 1.0 to about 1.5 and containing a predominant proportion of crystalline form C, and recovering the resultant alkylated aromatic hydrocarbon.

A specific embodiment of the invention is found in a process for the alkylation of benzene which comprises condensing benzene with ethylene at a temperature in the range of from about room temperature to about 400° C. and at a pressure in the range of from about atmospheric to about 100 atmospheres in the presence of a catalyst consisting of a mixture of from about 25 to about 18% by weight of a siliceous adsorbent and from about 75 to about 82% by weight of an oxygen acid of phosphorus having a $P_2O_5$ content of from about 79 to about 85 weight percent, said mixture having been calcined at a temperature in the range of from about 550° to about 900° C., said catalyst containing a mole ratio of $P_2O_5$ to $SiO_2$ in the range of from about 1.0 to about 1.5 and containing a predominant proportion of crystalline form C, and recovering the resultant ethylbenzene.

Other objects and embodiments referring to alternative alkylatable organic compounds and alternative alkylating agents will be found in the following further detailed description of the invention.

Many different classes of compounds may be alkylated by the process of this invention. Among such classes of compounds are aromatic compounds including aromatic hydrocarbons, phenols, salts of phenols, aromatic amines, aromatic halides, aromatic ketones and the salts of aromatic carboxylic acids. The preferred aromatic compounds are aromatic hydrocarbons, and particularly monocyclic aromatic hydrocarbons, that is, benzene hydrocarbons. Suitable aromatic hydrocarbons include benzene, toluene, o-xylene, m-xylene, p-xylene, ethylbenzene, o-diethylbenzene, m-diethylbenzene, p-diethylbenzene, 1,2,3-trimethylbenzene, 1,2,4-trimethylbenzene, 1,3,5-trimethylbenzene (mesitylene), o-ethyltoluene, m-ethyltoluene, p-ethyltoluene, n-propylbenzene, isopropylbenzene (cumene), etc. Higher molecular weight alkyl hydrocarbons are also suitable such as those produced by the alkylation of aromatic hydrocarbons with olefinic polymers. Such products are referred to in the art as alkylate, and include hexylbenzene, hexyltoluene, heptylbenzene, heptyltoluene, octylbenzene, nonylbenzene, nonyltoluene, decylbenzene, dodecylbenzene, etc. Very often alkylate is obtained as a high boiling fraction in which the alkyl group attached to the aromatic hydrocarbon varies in size from $C_9$ to $C_{18}$. Other suitable alkylatable aromatic hydrocarbons include those containing an unsaturated side chain such as styrene, vinyltoluene, allylbenzene, etc. Still other suitable utilizable aromatic hydrocarbons include those with two or more aryl groups such as diphenylmethane, triphenylmethane, fluorene, stilbene, etc. Examples of suitable alkylatable aromatic compounds which contain condensed benzene rings include naphthalene, anthracene, phenanthrene, chrysene, rubrene, indene, etc. Furthermore, by the term "alkylatable aromatic compound," it is also meant to include not only benzene derivatives, naphthalene derivatives and the like, but also all aromatic compounds containing a stable ring or nucleus such as is present in benzene, and which possess unsaturation in the sense that benzene does. Consequently, it can be seen that the term "aromatic compound" in the sense in which it is used in this specification and in the appended claims, includes not only carbocyclic compounds but also heterocyclic compounds having a stable nucleus. The carbocyclic compounds may have a benzene, naphthalene, anthracene, etc., nucleus, while the heterocyclic compounds may have a pyridine, furan, thiophene, pyrrole, pyrazole, etc., nucleus. In addition, the aromatic compounds contemplated for use in the present process may contain both a carbocyclic and a heterocyclic ring such as is found in indole and carbazole. Also, the aromatic compounds may contain both a benzene nucleus and a saturated ring such as is found in tetralin and in indan. The aromatic compounds containing non-hydrocarbon substituents which may be alkylated in the process of this invention include phenol, catechol, resorcinol, pyrogallol, aniline, o-toluidine, m-toluidine, p-toluidine, chlorobenzene, bromobenzene, etc. Among the aforementioned classes of alkylatable compounds the aromatic hydrocarbons constitute the preferred classes. The remaining alkylatable organic compounds are further not necessarily equivalent so that different reaction conditions may be necessary to involve them in reaction with the alkylating agents hereinafter set forth in the presence of the catalysts of this invention.

Suitable alkylating agents which may be utilized in this process are olefin-acting compounds including monoolefins, diolefins and polyolefins. The preferred olefin-acting compounds are olefinic hydrocarbons which comprise monoolefins having one double bond per molecule and polyolefins which have more than one double bond per molecule. Examples of these compounds include monoolefins which are either normally gaseous or normally liquid and include ethylene, propylene, 1-butene, 2-butene, isobutylene, the pentenes, hexenes and higher normally liquid olefins, the latter including various olefin polymers having from about 6 to about 18 carbon atoms per molecule, etc., and diolefins such as 1,3-butadiene, 1,3-pentadiene, 1,3-hexadiene, etc. Cycloolefins such as cyclopentene, cyclohexene, and various alkylcycloolefins such as methylcyclopentene, methylcyclohexene, etc., and polycyclic olefins such as bicyclo[2.2.1]-2-heptene may also be utilized, but generally not under the exact same conditions of operation applying to the non-cyclic olefins.

It is also contemplated within the scope of this invention that the alkylation of the aforesaid alkylatable compounds containing a replaceable hydrogen atom may be effected by utilizing certain substances capable of producing olefinic hydrocarbons, or intermediates thereof under the conditions of operation chosen for the process. Typical olefin producing substances capable of use include alkyl chlorides, alkyl bromides, and alkyl iodides capable of undergoing dehydrohalogenation to form olefinic hydrocarbons thereby containing at least one double bond per molecule. Examples of such alkyl halides include ethyl chloride, n-propyl chloride, isopropyl chloride, n-butyl chloride, isobutyl chloride, t-butyl chloride, the amyl chlorides, hexyl chlorides, etc., ethyl bromide, n-propyl bromide, isopropyl bromide, n-butyl bromide, isobutyl bromide, t-butyl bromide, the amyl bromides, hexyl bromides, etc., ethyl iodide, n-propyl iodide, isopropyl iodide, n-butyl iodide, isobutyl iodide, t-butyl iodide, the amyl iodides, hexyl iodides, etc.

As stated hereinabove olefinic hydrocarbons and especially normally gaseous olefinic hydrocarbons, are the particularly preferred alkylating agents for use in the process of this invention. This process, using the particular catalyst herein applied, can be successfully applied to and utilized for the conversion of olefinic hydrocarbons when said hydrocarbons are present in minor quantities in gas streams. Thus, in contrast to other processes, the normally gaseous olefinic hydrocarbon need not be purified or concentrated. Such normally gaseous olefinic hydrocarbons appear in minor concentrations in various refinery gas streams, usually diluted with various unreactive gases such as hydrogen, nitrogen, methane, ethane, propane, etc. These gas streams containing minor quantities of olefinic hydrocarbons are obtained in petroleum refineries from various refinery installations including thermal cracking units, catalytic cracking units, thermal reforming units, coking units, polymerization units, etc. Such refinery gas streams have in the past often been burned for fuel value since an economical process for their utilization as alkylating agents or olefin acting compounds has not been available except where concentration of the olefin hydrocarbons has been carried out concurrently therewith. This is particularly true for refinery gas streams containing relatively minor quantities of olefinic hydrocarbons such as ethylene. Thus, it has been possible catalytically to polymerize propylene and/or various butenes in refinery gas streams; however, the off-gases from such processes still contain ethylene. These refinery gas streams containing minor quantities of olefinic hydrocarbons are known as off-gases. In addition to containing minor quantities of olefinic hydrocarbons such as ethylene, propylene and the various butenes, depending upon their source, they contain varying quantities of nitrogen, hydrogen and various normally gaseous paraffinic hydrocarbons hereinbefore mentioned. Thus, a refinery off-gas ethylene stream may contain varying quantities of hydrogen, nitrogen, methane and ethane with the ethylene in minor proportions, while a refinery off-gas propylene stream is normally diluted with propane and contains the propylene in minor quantities. Likewise, an off-gas butene stream is normally diluted with butene and contains the butenes in minor quantities. A typical analysis in mole percent for a utilizable refinery off-gas from a catalytic cracking unit is as follows: nitrogen, 4.0%; carbon monoxide, 0.2%; hydrogen, 5.4%; methane, 37.8%; ethylene, 10.3%; ethane, 24.7%; propylene, 6.4%; propane, 10.7% and $C_4$ hydrocarbons, 0.5%. As readily observable the total olefin content of this gas stream is 16.7 mole percent and the ethylene content is even lower, namely 10.3 mole percent. Such gas streams containing olefinic hydrocarbons in minor or dilute quantities may be used as the alkylating agents or olefin-acting compounds within the broad scope of the present invention. Furthermore, it is readily apparent that only the olefin content of such gas streams undergoes reaction in the process of this invention, and that the remaining gases free from olefinic hydrocarbons are vented from the process. Thus, by using the particular catalyst hereinafter described as the condensation catalyst it is apparent that an alkylating process for the preparation of such compounds as ethylbenzene, cumene, cymene, diisopropylbenzene, etc., may be carried out in a more economical manner by using, as an alkylating agent, a product which was hereinbefore considered, for all intents and purposes, worthless.

The catalyst which is used as a condensation or alkylating catalyst in the process of this invention comprises a Solid Phosphoric Acid catalyst containing a higher proportion of phosphoric acid to siliceous adsorbent than that heretofore employed in producing composites which are later calcined to form finished catalysts, together with the utilization of a calcination temperature higher than that generally used in products such as the Solid Phosphoric Acid catalysts now commonly used in commercial processes. Calcination temperatures used heretofore in producing finished Solid Phosphoric Acid catalysts generally did not exceed about 425° C. except in instances where the calcined composite was given a further steam treatment in which instance the calcination temperature reached a maximum of 455° to 510° C. after which the calcined composite was treated with steam at a temperature of from about 230° to about 290° C. In the process of this invention a catalyst calcination temperature of from about 540° to about 900° C. and preferably a calcination temperature of from about 540° to about 675° C. is utilized. The calcination treatment is also carried out in a much shorter time than that employed heretofore, namely, a time of from about 0.25 to about 8 hours whereas the previously prepared catalysts having a $P_2O_5$ to siliceous adsorbent weight ratio of about 2 needed a calcination treatment at a temperature up to about 425° C. for a time of from about 1 to about 60 hours. The catalysts utilized in this process also have higher alkylation activities and higher crushing strengths than those of the catalysts produced heretofore. Such differences in activities and crushing strengths will be shown in more detail in the examples given hereinafter.

The oxygen acids of phosphorus used in the production of the Solid Phosphoric Acid catalysts comprise orthophosphoric acid and other related acids in which the phosphorus has a valence of 5 including pyrophosphoric acid, triphosphoric acid, tetraphosphoric acid, hexametaphosphoric acid as well as mixtures of these phosphoric acids. However, because of greater convenience in the mixing and calcining operations, it is generally preferable to employ the higher phosphoric acids, that is, those having a relatively high ratio of $P_2O_5$ to combined water. It is not intended to infer however that the different oxygen acids of phosphorus, which may be employed in this process, will produce catalysts having identical effects upon any given organic reaction mixture as each of the catalysts produced from different acids and by slightly varied procedure will have its own characteristic action.

In using orthophosphoric acid as a primary ingredient, different concentrations of the aqueous solution may be employed, for example, acid containing from about 75 to about 100% $H_3PO_4$ or orthophosphoric acid containing some free phosphorus pentoxide may even be used. By this is meant that the ortho acid may contain a definite percentage of the pyro acid which corresponds to the primary phase of dehydration of orthophosphoric acid. Within these concentration ranges, the acids will be liquids of varying viscosities and these liquids are readily mixed with adsorbent materials. In practice it has been found that pyrophosphoric acid corresponding to the formula $H_4P_2O_7$ can be incorporated with siliceous adsorbents at a temperature somewhat above its melting point (namely, 61° C.) and that the period of heating which is given to the pyro acid-adsorbent mixtures may be different from that used when the ortho acid is so employed.

Triphosphoric acid which may be represented by the formula $H_5P_3O_{10}$ may also be used as a starting material for preparation of these catalysts. These catalytic compositions may also be prepared from the siliceous materials mentioned herein and a phosphoric acid mixture containing orthophosphoric, pyrophosphoric, triphosphoric, and other polyphosphoric acids.

Another acid of phosphorus which may be employed in the manufacture of composite catalysts is tetraphosphoric acid. It has the general formula $H_6P_4O_{13}$ which corresponds to the double oxide formula $3H_2O \cdot 2P_2O_5$ which in turn may be considered as the acid resulting when three molecules of water are lost by four molecules of orthophosphoric acid $H_3PO_4$. The tetraphosphoric acid may be manufactured by the gradual and controlled dehydration by heating of orthophosphoric acid or pyrophosphoric acid or by adding phosphorus pentoxide to these acids in proper amounts. When the latter procedure is followed, phosphoric anhydride is added gradually until its amounts to 520% by weight of the total water present. After a considerable period of standing at ordinary temperature, the crystals of the tetraphosphoric acid separate from the viscous liquid and it is found that these crystals melt at approximately 34° C. and have a specific gravity of 1.1886 at a temperature of 15° C. However, it is unnecessary to crystallize the tetraphosphoric acid before employing it in the preparation of the solid catalyst inasmuch as the crude tetraphosphoric acid mixture may be incorporated directly with the siliceous adsorbent.

A phosphoric acid mixture which is generally referred to as polyphosphoric acid may also be employed. Polyphosphoric acid is formed by heating orthophosphoric acid or pyrophosphoric acid or mixtures thereof in suitable equipment such as carbon lined trays heated by flue gases or other suitable means to produce a phosphoric acid mixture generally analyzing from about 79 to about 85% by weight of $P_2O_5$. Such a liquid mixture of phosphoric acids with 79.5% $P_2O_5$ content was found by analysis to contain 24.5% of orthophosphoric acid ($H_3PO_4$), 45.2% of pyrophosphoric acid ($H_4P_2O_7$), 26.0% of triphosphoric acid ($H_5P_3O_{10}$), and 4.3% by weight of unidentified phosphoric acids. Another polyphosphoric acid mixture somewhat more concentrated than the one just referred to and having a $P_2O_5$ content of 84% by weight was found by analysis to contain about 57% by weight of triphosphoric acid ($H_5P_3O_{10}$), 17% by weight of hexametaphosphoric acid (($HPO_3)_6$), 11% of pyrophosphoric acid ($H_4P_2O_7$), 5% by weight of orthophosphoric acid ($H_3PO_4$), and 10% by weight of unidentified phosphoric acids.

The materials which may be employed as adsorbents or carriers for oxygen acids of phosphorus are divided roughly into two classes. The first class comprises materials of predominately siliceous character and includes diatomaceous earth, kieselguhr, and artificially prepared porous silica. The second class of materials which may be employed either alone or in conjunction with the first class comprises generally certain members of the class of aluminum silicates and includes such naturally occurring substances as various fuller's earths and clays such as bentonite, montmorillonite, acid treated clays and the like. Each adsorbent or supporting material which may be used will exert its own specific influence upon the net effectiveness of the catalyst composite which will not necessarily be identical with that of other members of the class.

In producing the catalyst composites which are utilized in the present invention, an oxygen acid of phosphorus and a siliceous adsorbent are mixed at a temperature of from about 10° to about 232° C. and preferably at a temperature of from about 95° to about 180° C. to form a composite. Thus satisfactory results have been obtained by heating polyphosphoric acid (84% $P_2O_5$ content) at a temperature of about 170° C. and then mixing this hot acid with diatomaceous earth which has previously been at room temperature. The polyphosphoric acid and diatomaceous earth form a composite in which the weight ratio of phosphorus pentoxide to diatomaceous adsorbent is from about 2.5 to about 7.5. This composite is slightly moist to almost dry in appearance but becomes plastic when subjected to pressure in a hydraulic press-type or auger type extruder by which the composite is formed into pieces that are cut into shaped particles. The resultant catalyst composite while it is still hot is thus extruded through a die preheated to a temperature of about 170° C. The extruded particles of catalyst are then calcined by heating in air, nitrogen, flue gas or some other inert gas at a temperature of from about 540° to about 900° C. and preferably at a temperature of from about 540° to about 675° C. for a time of from about 0.25 to about 8 hours and preferably about 0.5 to about 2 hours to form a substantially granular catalytic material.

In order to further point out the differences which exist between catalysts previously prepared by calcination below 460° C. and containing less than 75% by weight of phosphoric acid, generally in a range of from about 60 to about 65% by weight, as distinguished from catalysts which contain above 75% by weight of phosphoric acid and which have been calcined at a temperature in the range of from about 540° to about 900° C. various samples of the catalysts were analyzed by means of X-ray diffraction. When Solid Phosphoric Acid catalysts are prepared with different mole ratios of $P_2O_5$ to $SiO_2$ and at different calcination temperatures it has been found that various crystalline forms are present in the finished catalyst and it is believed that the activity and crushing strength as well as other properties of these catalysts are dependent upon these crystalline modifications which are present. In this respect, and as will be shown in more detail, the catalysts prepared according to the prior art method, that is, catalysts which contain a relatively low percentage of $P_2O_5$, a relatively low mole ratio of $P_2O_5$ to $SiO_2$ that is, from about 0.53 to about 0.87 mole of $P_2O_5$ per mole of $SiO_2$ and which have been calcined at a temperature below about 460° C. and usually at a temperature of about 370° C. contain a crystalline modification which is designated as form "B." Conversely, catalysts which contain a higher mole ratio of $P_2O_5$ to $SiO_2$, that is, from about 1.0 to about 3.0 and preferably from about 1.0 to about 1.5 moles of $P_2O_5$ to mole of $SiO_2$ with a correspondingly greater percentage of total $P_2O_5$ present in the catalyst and which have been calcined at a temperature in the range of from about 540° to about 900° C. have been found to possess a predominant proportion of a crystalline modification which is designated as form "C." To further illustrate this difference a series of samples were prepared with varying $P_2O_5$–$SiO_2$ mole ratios and various calcination temperatures. The mole ratios of $P_2O_5$–$SiO_2$ varied over a range of from about 0.53 to about 1.30 and calcination temperatures ranging from about 372° to about 900° C. were used. The changes in the crystalline phase of the samples were followed by observing the X-ray diffraction pattern. The samples thus prepared were ground and passed through a 140-mesh screen. In some cases the moisture content of the samples was too high, thus preventing their passage through the screen. These samples were placed in a vacuum desiccator for two days; however, the moisture content was still too high. Therefore, these samples were screened to the smallest obtainable particle size and thereafter scanned by X-ray.

In order to determine the amount of sample present in the X-ray beam it was necessary to add an internal standard. Inasmuch as nickel oxide has an intense diffraction line occurring at 43.5° 2θ in the general region of interest, but not directly interfering with the patterns of the sample, it proved to be a suitable internal standard. The Norelco X-ray diffraction equipment which includes a copper target X-ray tube operated at 35 kvp. and 18 ma., a Geiger counter-diffractometer to scan the diffraction patterns and a ratemeter recorder was utilized in these determinations. The samples were packed in the flat diffractometer sample holders. The sample slit system consisted of a 1° divergence slit, 0.020″ receiver slit (1° scatter), and a 4° scatter slit. The sample was scanned at ½°/minute with the ratemeter at factor 16 and a 4 x 4 second time constant. By inspecting the various diffraction patterns obtained from the samples the following line diffraction values for the various crystallite forms have been made.

| Form | d, A. | | | °2θ | | |
|---|---|---|---|---|---|---|
| B | 3.52 S | 1.31 M.S | 6.60 M.S | 25.3 | 72.0 | 12.4 |
| C | 3.67 S | 3.24 M | 3.34 M | 24.3 | 26.7 | 27.5 |
| D | 3.83 M.S | 3.32 M | 3.50 W | 23.3 | 26.8 | 25.4 |

S—strong. M.S.—moderately strong. M—moderate. W—weak. d—interplanar spacings, A. °2θ—angles equivalent to the interplanar spacings when copper radiation is used.

As is apparent from the above figures crystalline form "B" has a strong interplanar spacing at 3.52 A. and moderately strong spacings at 1.31 and 6.60 A., while crystalline form "C" has a strong interplanar spacing at 3.67 A. and moderate spacings at 3.24 and 3.34 A.

It is noted from above table that in certain samples of the catalysts the appearance of new diffraction lines which were not present in pure form "C" or in pure form "B" indicates the presence of different crystalline form. Form "D" as shown above is associated with a moderately internal diffraction line appearing at 23.3° while the presence of form "E" is associated with the diffraction lines occurring at 29.4° and 24.2°.

A comparison of the samples of catalyst using various $P_2O_5/SiO_2$ mole ratios at various calcination temperatures is shown in the following table.

TABLE I.—X-RAY DIFFRACTION STUDY OF VARIOUS EXPERIMENTAL SPA CATALYSTS

| Sample | Temp., °C. | $P_2O_5/SiO_2$, mol ratio | Qualitative Analysis | | Percent by Wt. | | |
|---|---|---|---|---|---|---|---|
| | | | Infrared | X-ray | B | C | E |
| 1 | 372 | 0.53 | B | B | 69.4 | 0 | 0 |
| 2 | 372 | 0.87 | B+D | B+C+D | 81.5 | 18.5 | 0 |
| 3 | 560 | 1.08 | C+D | C+D | 12.2 | 78.5 | 0 |
| 4 | 900 | 1.08 | C+E | C+D | 9.1 | 74.0 | 10.6 |
| 5 | 560 | 1.15 | C+D | C+D | 7.5 | 61.5 | 0 |
| 6 | 560 | 1.23 | C+D | C+D | 8.1 | 70.0 | 0 |
| 7 | 560 | 1.30 | C+D | C+D | 3.3 | 92.5 | 0 |
| 8 | 900 | 1.30 | C+E | C+E | 10.0 | 65.0 | 25 |

Therefore, it is readily apparent from the above table that catalysts which contain a mole ratio of $P_2O_5$ to $SiO_2$ in excess of about 1.08 and which have been calcined at temperatures ranging from about 560° to about 900° C. possess a predominant proportion of crystalline form "C" and as will be hereinafter shown these catalysts also possess a higher degree of activity when used as alkylation catalysts for the alkylation of alkylatable aromatic hydrocarbons with alkylating agents such as ethylene or propylene than do catalysts which contain a lower mole ratio of $P_2O_5$ to $SiO_2$ and have been calcined at a temperature of around 370° C., the latter catalysts containing a predominant proportion of crystalline form "B."

The process of this invention utilizing the particular catalyst to alkylate and alkylatable organic compound containing a replaceable hydrogen atom with an alkylating agent may be effected in any suitable manner and may comprise either a batch or a continuous type operation. When a batch type operation is used a quantity of the starting materials, namely, the alkylatable organic compound such as an aromatic hydrocarbon and the alkylating agent are placed in a suitable condensation apparatus such as a rotating autoclave or an alkylation flask along with the hereinbefore mentioned Solid Phosphoric Acid catalyst which has been calcined at a temperature in the range of from about 560° to about 900° C. The apparatus is sealed and heated to the desired temperature which may be in a range of from about atmospheric to about 400° C. In addition the process may also be carried out at pressures ranging from about atmospheric to about 100 atmospheres or more. However, the pressure does not appear to be a critical variable inasmuch as the process may be carried out in either a liquid or vapor phase. Thus, the pressure utilized may be selected purely from the most advantageous pressure based upon economic considerations and upon the stability of the particular reactants which are charged to the process under the necessary processing conditions. At the end of a predetermined residence time the apparatus and contents thereof are allowed to cool to room temperature, any excess pressure present is vented and the desired reaction product comprising an alkylatable aromatic compound is separated from the catalyst by conventional means such as filtration, further separated from any unreacted starting materials and recovered by conventional means such as, for example, by fractional distillation, crystallization, etc.

The process of this invention may also be effected in a continuous type operation. The solid phosphoric acid catalyst of the particular type hereinbefore described is particularly suitable to be used in a fixed bed type of operation. In this type of operation the catalyst is disposed as a fixed bed in a reaction zone which may comprise either an unpacked vessel or coil or which may be lined with an adsorbent packing material such as dehydrated bauxite, fire brick, alumina and the like. The reaction zone is maintained at the proper operating conditions of temperature and pressure while the reactants comprising the alkylatable organic compound and the alkylating agent are continuously charged thereto through separate lines or, if so desired, the reactants may be admixed prior to entry into said reaction zone and charged thereto in a single stream. In carrying out the process of this invention in a continuous type of operation liquid hourly space velocities (the volume of liquid hydrocarbon charged to the reactor per volume of catalyst per hour) may be varied within a relatively wide range of from about 0.1 to about 20 or more, the preferred range being from about 0.1 to about 10. The desired reaction product is continuously withdrawn from the reaction zone, separated from the reactor effluent and purified by conventional means hereinbefore set forth while the unreacted feed stocks may be recharged to the reaction zone as a portion of the feed material.

Other continuous types of operation which may be used in this process include the compact moving bed type of operation in which the bed of catalyst and the reactants pass either concurrently or countercurrently to each other in the reaction zone, the slurry type process in which the catalyst is carried into the reaction zone as a slurry in one of the reactants and, if the alkylating agent is in gaseous form, the fluidized type of operation in which the catalyst is maintained in a state of turbulence under hindered settling conditions in the reaction zone.

The following examples are given to illustrate the process of the present invention, which, however, are not intended to limit the generally broad scope of the present invention in strict accordance therewith.

*Example I*

A quantity of the desired catalyst, that is, a Solid Phosphoric Acid catalyst which contained about 80% phosphoric acid and had been calcined at a temperature of about 560° C. was prepared by stirring 43.2 g. of a diatomaceous earth known in the trade as Celite FC into 160 g. of polyphosphoric acid (83.5% $P_2O_5$) which had been preheated for 20 minutes at 170° C. After a 5 minute mixing the resultant composite was heated in an oven at 170° C. for a period of approximately 30 minutes. After the first 10 minutes of this 30 minute period had elapsed the catalyst composite was stirred every 5 minutes. Prior to being put in the oven the catalyst composite was a wet, plastic mass which remained practically unchanged in appearance and consistency for 25 of the 30 minute period in the oven. However, the last 5 minutes of the drying period changed the appearance to a hardened mass of composite. The hardened composite was then taken from the oven and extruded on a hydraulic press through a die which had been preheated to a temperature of 170° C. The extruded strands were cut into pill shape and were then heated for one hour at 170° C., after which they were calcined in a muffle furnace for one hour at 560° C.

The catalyst thus prepared, which contained a predominant proportion of crystalline form "C," was used for the alkylation of benzene with ethylene in the following manner:

A benzene feed was charged to a jacketed reactor containing 193 g. of the catalyst prepared in the above manner as was the feed gas comprising a synthetic blend consisting of ethylene, ethane and methane. The conditions under which the reaction took place were a pressure of 900 p.s.i.g. (63 atmospheres), a liquid hourly space velocity of 0.75, a benzene/ethylene mole ratio of about 10, 0.26 mole percent water on the combined feed and a temperature of 290° C. The runs were made for periods of 22, 22 and 48 hours respectively. Mass spectrometer analysis of the feed and exit gases showed that the conversion of ethylene was virtually complete. The crude liquid products were fractionally distilled and the desired cuts were subjected to an infra-red analysis which showed that 85 to 88% of the converted ethylene, or 93 to 95% of the converted benzene were accounted for as ethylbenzene. The results of these runs appear in Table II below.

TABLE II

| Percent ethylene converted | 99 | 99 | 97 |
|---|---|---|---|
| Percent converted ethylene accounted for as: | | | |
| Ethylbenzene | 85.1 | 88.1 | 87.9 |
| Higher aromatics | 14.9 | 11.9 | 12.1 |
| Total | 100.0 | 100.0 | 100.0 |
| Percent converted benzene accounted for as: | | | |
| Ethylbenzene | 93.0 | 94.3 | 94.5 |
| Higher aromatics | 7.0 | 5.7 | 5.5 |
| Total | 100.0 | 100.0 | 100.0 |

Two additional runs were made using similar conditions with one exception, that is, the runs were made at a temperature of 315° C., the results of these two runs appearing in Table III below.

TABLE III

| Percent ethylene converted | 98 | 98 |
|---|---|---|
| Percent converted ethylene accounted for as: | | |
| Ethylbenzene | 85.6 | 86.1 |
| Higher aromatics | 14.4 | 13.9 |
| Total | 100.0 | 100.0 |
| Percent converted benzene accounted for as: | | |
| Ethylbenzene | 93.3 | 93.2 |
| Higher aromatics | 7.0 | 6.8 |
| Total | 100.0 | 100.0 |

The catalyst after having been used for a total period of 123 hours, was analyzed and was found to have an increase of free $P_2O_5$ from 12.2% to 16.7% while the total $P_2O_5$ went from 58.0% to 56.9%.

To illustrate the advantage of using a catalyst of the type hereinbefore set forth the above experiment was repeated using a regular Solid Phosphoric Acid catalyst which was calcined at a lower temperature, i.e., below 560° C. and contained about 75% phosphoric acid prior to calcination, said catalyst containing a predominate proportion of crystalline form "B." A benzene feed was charged to a jacketed reactor containing 185 g. of catalyst. A feed gas comprising a synthetic blend of ethylene, ethane and methane was also charged thereto. The conditions were similar to those abovementioned, that is, a pressure of 900 p.s.i.g. (63 atmospheres), a liquid hourly space velocity of 0.75, a benzene/ethylene mole ratio of approximately 10.8, a moisture content of 0.26 mole percent on the combined feed and a temperature of 290° C. The runs were made for periods of 12, 24 and 23 hours. The results for these runs appear below in Table IV.

TABLE IV

| Percent ethylene converted | 86.6 | 86.7 | 86.7 | 87.2 |
|---|---|---|---|---|
| Percent converted ethylene accounted for as ethylbenzene | 87.31 | 88.39 | 89.15 | 88.09 |
| Percent converted benzene accounted for as ethylbenzene | 94.10 | 94.43 | 95.03 | 94.33 |

Therefore, it is readily apparent that the first catalyst which was calcined at a temperature of about 560° C. and contained about 80% phosphoric acid prior to calcination exhibited a greater ability to convert the ethylene than did the latter catalyst.

*Example II*

Another experiment was run in which the feed consisted of a simulated cat cracker off-gas. The simulated cat cracker off-gas was a synthetic blend of ethylene, nitrogen, hydrogen and methane, the ethylene content being about 12 mol percent. The aromatic feed comprised a thiophene free benzene containing about 0.4% by weight of isopropyl alcohol to provide water of hydration for the catalyst. The conditions under which the experiment was run were a pressure of approximately 65 atmospheres, a temperature ranging from about 290° C. at the beginning to about 315° C. at the end of the run, a liquid hourly space velocity of 0.57 and a benzene to total olefin mol ratio of about 8. The catalyst was prepared in a manner similar to that set forth above in Example I, that is, the composite comprised about 80% polyphosphoric acid and 20% Celite FC which was mixed, dried, extruded and calcined for one hour at 560° C., the finished catalyst containing a predominant proportion of crystalline form "C." The results of this experiment which consisted of a 580 hour life test of the catalyst with respect to activity, stability, product distribution and quality of the catalyst are set forth in Table V below.

TABLE V

| Catalyst—Age in hours at: | | | | | | | | |
|---|---|---|---|---|---|---|---|---|
| Start of period | 6 | 125 | 248 | 268 | 372 | 388 | 468 | 484 |
| End of period | 125 | 243 | 268 | 364 | 388 | 460 | 484 | 580 |
| Mole percent water (combined feed) | 0.25 | 0.25 | 0.25 | 0.25 | 0.02 | 0.02 | 0.02 | 0.006 |
| Catalyst temperature, ° C | 290 | 294 | 317 | 317 | 317 | 316 | 318 | 318 |
| Percent ethylene converted (average) | 77.4 | 72.8 | 82.6 | 83.3 | 85.5 | 87.8 | 90.0 | 90.0 |
| Percent propylene converted | 100.0 | 100.0 | 100.0 | 100.0 | | | | |
| Percent converted ethylene accounted for as: | | | | | | | | |
| Ethylbenzene | 81.5 | 82.9 | | 83.4 | | 850.0 | | 91.2 |
| s-Butylbenzene | | 1.5 | | 1.4 | | 1.3 | | 0.7 |
| Diethylbenzenes | 14.1 | 11.3 | | 10.5 | | 9.2 | | 3.1 |
| Bottoms calculated as diethylbenzenes | 4.4 | 4.3 | | 4.7 | | 4.5 | | 5.0 |
| Total | 100.0 | 100.0 | | 100.0 | | 100.0 | | 100.0 |
| Percent Converted propylene accounted for as: | | | | | | | | |
| Cumene | 100.0 | 99.7 | | 98.6 | | | | |
| -Methylstyrene | | 0.3 | | 1.4 | | | | |
| Total | 100.0 | 100.0 | | 100.0 | | | | |
| Percent Converted benzene accounted for as: | | | | | | | | |
| Toluene | 0.2 | 0.1 | | 0.1 | | 0.1 | | 0.1 |
| Ethylbenzene | 84.8 | 85.7 | | 86.9 | | 91.9 | | 95.3 |
| Cumene | 5.4 | 5.4 | | 4.4 | | | | |
| -Methylstyrene | | Trace | | Trace | | | | |
| s-Butylbenzenes | | 0.8 | | 0.7 | | 0.7 | | 0.4 |
| Diethylbenzenes | 7.3 | 5.8 | | 5.4 | | 4.9 | | 1.6 |
| Bottoms | 2.3 | 2.2 | | 2.5 | | 2.4 | | 2.6 |
| Total | 100.0 | 100.0 | | 100.0 | | 100.0 | | 100.0 |

The liquid feed for the period running from 372 hours to 580 hours comprised pure benzene with no isopropyl alcohol present in the feed. These results show that alkylation of the benzene feed under essentially anhydrous conditions, that is, after 364 hours of the test before which time the isopropyl alcohol was dehydrated to provide 0.25 mole percent water on the combined feed, and at a temperature of approximately 315° C. resulted in an improvement in the ethylene conversion as well as a substantial improvement in the efficiency of the conversion of ethylene and of benzene to ethylbenzene. During the latter quarter of the test (that period running from 460 hours to 580 hours) less than 10% of the converted ethylene and only 5% of the converted benzene was tied up in material boiling above the ethylbenzene range.

The used catalyst, upon completion of the run, was removed from the reactor and was found to contain less than 1% carbon and to have increased in free $P_2O_5$ from 12.4% to about 17% while there did not appear to have been anly loss of total $P_2O_5$, the fresh catalyst had a total $P_2O_5$ content of 58.30%, the used catalyst having an average total $P_2O_5$ content of 58.26%. In addition the crushing strength of the catalyst after use was found to be approximately 11.6 lbs.

Therefore, it can be readily seen that the particular catalyst which is used in this reaction, that is, a catalyst which contained about 80% polyphosphoric acid which has been composited with a solid support and calcined at a relatively high temperature of over 530° C. may be used as an alkylation or condensation catalyst at a relatively low temperature and without the need of any additional moisture to maintain the activity of the catalyst.

*Example III*

To illustrate the effectiveness of the catalyst which was calcined at a temperature in excess of 540° C., another life test run was performed in which the catalyst used in the alkylation of benzene with a simulated cat cracker off-gas comprised a Solid Phosphoric Acid catalyst which had been calcined at a temperature in the range of from about 340° to about 460° C. and contained less than 80% polyhosphoric acid, the catalyst also containing a predminate proportion of crystalline form "B." The simulated cat cracker off-gas feed consisted essentially of ethylene, nitrogen, hydrogen and methane, the ethylene content being about 12 mole percent. The benzene feed consisted of about 98% thiophene free benzene and 2% isopropyl alcohol. The conditions under which the test was run were: a temperature of about 350° C., a pressure of about 65 atmospheres, a liquid hourly space velocity ranging from about 2 to about 0.6, a benzene to total olefin mol ratio ranging from about 15 to about 7 and a moisture content of about 1.4 mol percent calculated on the combined feed. The recovered product was subjected to fractional distillation and the desired fractions were subjected to infra-red analysis to determine the percentage of each component in the product which was recovered. The results of this test appear in Table VI below.

TABLE VI

| | | | | | | | | |
|---|---|---|---|---|---|---|---|---|
| Temperature, ° C. | 348 | 350 | 351 | 350 | 350 | 351 | 350 | 348 |
| Catalyst—Age in hours used at: | | | | | | | | |
| Start of period | 6 | 132 | 149 | 245 | 266 | 290 | 386 | 518 |
| End of period | 125 | 149 | 245 | 261 | 290 | 386 | 506 | 583 |
| Mositure, mole percent on combined feed | 1.40 | 1.38 | 1.39 | 1.39 | 1.40 | 1.39 | 1.40 | 1.39 |
| Percent ethylene converted (average) | 29 | 60 | 55 | 53 | 52 | 56 | 43 | 73 |
| Percent converted ethylene accounted for as: | | | | | | | | |
| Ethylbenzene | 89.6 | -------- | 88.1 | -------- | -------- | 88.1 | 88.7 | 88.5 |
| Higher aromatics | 10.4 | -------- | 11.9 | -------- | -------- | 11.9 | 11.3 | 11.5 |
| Total | 100.0 | -------- | 100.0 | -------- | -------- | 100.0 | 100.0 | 100.0 |
| Percent converted propylene accounted for as paraffins plus olefins boiling at 80.5-136° C.: | | | | | | | | |
| Cumene | 94.4 | -------- | 91.5 | -------- | -------- | 91.3 | 2.0 | 0.8 |
| | | | | | | | 84.8 | 85.7 |
| Higher aromatics | 5.6 | -------- | 8.5 | -------- | -------- | 8.7 | 13.2 | 13.5 |
| Total | 100.0 | -------- | 100.0 | -------- | -------- | 100.0 | 100.0 | 100.0 |
| Percent benzene accounted for as: | | | | | | | | |
| Toluene | 1.1 | -------- | 0.4 | -------- | -------- | 0.4 | 0.1 | 0.1 |
| Ethylbenzene | 38.3 | -------- | 60.4 | -------- | -------- | 58.2 | 53.7 | 66.1 |
| Cumene | 56.7 | -------- | 33.5 | -------- | -------- | 35.8 | 39.6 | 27.4 |
| Higher aromatics | 3.9 | -------- | 5.7 | -------- | -------- | 5.6 | 6.6 | 6.4 |
| Total | 100.0 | -------- | 100.0 | -------- | -------- | 100.0 | 100.0 | 100.0 |

The catalyst was removed at the end of the total period of 583 hours and was found to be carbonized, there being approximately 7% carbon on the extracted sample. In addition the total $P_2O_5$ content was reduced from 58% to about 50% with a corresponding loss of free $P_2O_5$ of from 16% to approximately 9%. In addition the crushing strength decreased to about 7 lbs.

It is to be noted that the catalyst which was prepared by calcination at a relatively high temperature, that is, over 540° C. retained its activity after a life test of about 580 hours, showed an increase in $P_2O_5$ content, and contained considerably less carbon while the catalyst which was calcined at a lower temperature and which contained a lesser amount of phosphoric acid than did the first named catalyst, showed a decrease in activity over the life of the test, contained a considerably larger portion of carbon with a corresponding decrease in the total amount of $P_2O_5$ and free $P_2O_5$ and, in addition, did not provide the conversion of ethylene to ethylbenzene as did the first catalyst. Furthermore, the latter catalyst required a higher reaction temperature and the presence of moisture in order to effect the condensation of the aromatic feed with the olefin whereas the former catalyst required a considerably lower temperature and also performed better under virtually anhydrous conditions, the ethylene conversion being increased in the absence of moisture rather than being decreased.

*Example IV*

A catalyst is prepared in a manner similar to that set forth in Example I above. This catalyst is utilized to alkylate toluene by charging toluene to a jacketed reactor containing a quantity of the catalyst which contained over 75% phosphoric acid, is calcined at a temperature of about 560° C. and contains a predominant proportion of crystalline form C. The alkylating agent comprising propylene is charged to the reactor which is maintained at a temperature of about 290° C. and a pressure of about 63 atmospheres. The desired cymene is continuously withdrawn and separated from the reactor effluent.

*Example V*

A catalyst which is prepared in a manner similar to that set forth in Example I above is utilized in the alkylation of phenol under conditions similar to that set forth in the above examples. A jacketed reactor containing the catalyst is maintained at the operating conditions of about 200° C. and a pressure of about 70 atmospheres while phenol and ethylene are continuously charged thereto. The ethylated phenol is continuously withdrawn, separated from the reactor effluent, purified by conventional means and recovered.

*Example VI*

In this example benzene is subjected to alkylation in the presence of a catalyst similar to that set forth in Example I above, the alkylating agent in this experiment comprising propylene. The resultant cumene is recovered by conventional means similar to that set forth in the above examples.

We claim as our invention:

1. A process for the alkylation of an alkylatable aromatic compound containing a replaceable hydrogen atom which comprises condensing the nucleus of said compound with an olefin at a temperature in the range of from about room temperature to about 400° C. and at a pressure in the range of from about atmospheric to about 100 atmospheres in the presence of a catalyst consisting of a mixture of from about 25 to about 10% by weight of a siliceous adsorbent and from about 75 to about 90% by weight of an oxygen acid of phosphorus having a $P_2O_5$ content of from about 79 to about 85 weight percent, said mixture having been calcined at a temperature in the range of from about 550° to about 900° C., said catalyst being characterized by containing a mole ratio of $P_2O_5$ to $SiO_2$ of from about 1.0 to about 3.0, and recovering the resultant alkylated aromatic compound.

2. A process for the alkylation of an alkylatable aromatic hydrocarbon containing a replaceable hydrogen atom which comprises condensing said hydrocarbon with an olefin at a temperature in the range of from about room temperature to about 400° C. and at a pressure in the range of from about atmospheric to about 100 atmospheres in the presence of a catalyst consisting of a mixture of from about 25 to about 10% by weight of a siliceous adsorbent and from about 75 to about 90% by weight of an oxygen acid of phosphorus having a $P_2O_5$ content of from about 79 to about 85 weight percent, said mixture having been calcined at a temperature in the range of from about 550° to about 900° C., said catalyst being characterized by containing a mole ratio of $P_2O_5$ to $SiO_2$ of from about 1.0 to about 3.0, and recovering the resultant alkylated aromatic hydrocarbon.

3. A process for the alkylation of an alkylatable aromatic hydrocarbon containing a replaceable hydrogen atom which comprises condensing said hydrocarbon with a monoolefinic hydrocarbon at a temperature in the range of from about room temperature to about 400° C. and at a pressure in the range of from about atmospheric to about 100 atmospheres in the presence of a catalyst consisting of a mixture of from about 25 to about 10% by weight of a siliceous adsorbent and from about 75 to about 90% by weight of an oxygen acid of phosphorus having a $P_2O_5$ content of from about 79 to about 85 weight percent, said mixture having been calcined at a temperature in the range of from about 550° to about 900° C., said catalyst being characterized by containing a mole ratio of $P_2O_5$ to $SiO_2$ of from about 1.0 to about 3.0, and recovering the resultant alkylated aromatic hydrocarbon.

4. A process for the alkylation of an alkylatable aromatic hydrocarbon containing a replaceable hydrogen atom which comprises condensing said hydrocarbon with a diolefinic hydrocarbon at a temperature in the range of from about room temperature to about 400° C. and at a pressure in the range of from about atmospheric to about 100 atmospheres in the presence of a catalyst consisting of a mixture of from about 25 to about 10% by weight of a siliceous adsorbent and from about 75 to about 90% by weight of an oxygen acid of phosphorus having a $P_2O_5$ content of from about 79 to about 85 weight percent, said mixture having been calcined at a temperature in the range of from about 550° to about 900° C., said catalyst being characterized by containing a mole ratio of $P_2O_5$ to $SiO_2$ of from about 1.0 to about 3.0, and recovering the resultant alkylated aromatic hydrocarbon.

5. A process for the alkylation of an alkylatable aromatic hydrocarbon containing a replaceable hydrogen atom which comprises condensing said hydrocarbon with a cycloolefinic hydrocarbon at a temperature in the range of from about room temperature to about 400° C. and at a pressure in the range of from about atmospheric to about 100 atmospheres in the presence of a catalyst consisting of a mixture of from about 25 to about 10% by weight of a siliceous adsorbent and from about 75 to about 90% by weight of an oxygen acid of phosphorus having a $P_2O_5$ content of from about 79 to about 85 weight percent, said mixture having been calcined at a temperature in the range of from about 550° to about 900° C., said catalyst being characterized by containing a mole ratio of $P_2O_5$ to $SiO_2$ of from about 1.0 to about 3.0, and recovering the resultant alkylated aromatic hydrocarbon.

6. A process for the alkylation of an alkylatable aromatic hydrocarbon containing a replaceable hydrogen atom which comprises condensing said hydrocarbon with an olefinic alkylating agent at a temperature in the range of from about room temperature to about 400° C. and at a pressure in the range of from about atmospheric to about 100 atmospheres in the presence of a catalyst consisting of a mixture of from about 25 to about 18% by weight of a siliceous adsorbent and from about 75 to about 82% by weight of an oxygen acid of phosphorus having a $P_2O_5$ content of from about 79 to about 85 weight percent, said mixture having been calcined at a temperature in the range of from about 550° to about 900° C., said catalyst containing a mole ratio of $P_2O_5$ to $SiO_2$ in the range of from about 1.0 to about 1.5, and recovering the resultant alkylated aromatic hydrocarbon.

7. A process for the alkylation of benzene which comprises condensing said benzene with an olefinic hydrocarbon at a temperature in the range of from about room temperature to about 400° C. and at a pressure in the range of from about atmospheric to about 100 atmospheres in the presence of a catalyst consisting of a mixture of from about 25 to about 18% by weight of a siliceous adsorbent and from about 75 to about 82% by weight of an oxygen acid of phosphorus having a $P_2O_5$ content of from about 79 to about 85 weight percent, said mixture having been calcined at a temperature in the range of from about 550° to about 900° C., said catalyst containing a mole ratio of $P_2O_5$ to $SiO_2$ in the range of from about 1.0 to about 1.5, and recovering the resultant alkylated benzene.

8. A process for the alkylation of toluene which comprises condensing said toluene with an olefinic hydrocarbon at a temperature in the range of from about room temperature to about 400° C. and at a pressure in the range of from about atmospheric to about 100 atmospheres in the presence of a catalyst consisting of a mixture of from about 25 to about 18% by weight of a siliceous adsorbent and from about 75 to about 82% by weight of an oxygen acid of phosphorus having a $P_2O_5$ content of from about 79 to about 85 weight percent, said mixture having been calcined at a temperature in the range of from about 550° to about 900° C., said catalyst containing a mole ratio of $P_2O_5$ to $SiO_2$ in the range of from about 1.0 to about 1.5, and recovering the resultant alkylated toluene.

9. A process for the alkylation of benzene which comprises condensing benzene with ethylene at a temperature in the range of from about room temperature to about 400° C. and at a pressure in the range of from about atmospheric to about 100 atmospheres in the presence of a catalyst consisting of a mixture of from about 25 to about 18% by weight of a siliceous adsorbent and from about 75 to about 82% by weight of an oxygen acid of phosphorus having a $P_2O_5$ content of from about 79 to about 85 weight percent, said mixture having been calcined at a temperature in the range of from about 550° to about 900° C., said catalyst containing a mole ratio of $P_2O_5$ to $SiO_2$ in the range of from about 1.0 to about 1.5, and recovering the resultant ethylbenzene.

10. A process for the alkylation of benzene which comprises condensing benzene with propylene at a temperature in the range of from about room temperature to about 400° C. and at a pressure in the range of from about atmospheric to about 100 atmospheres in the presence of a catalyst consisting of a mixture of from about 25 to about 18% by weight of a siliceous adsorbent and from about 75 to about 82% by weight of an oxygen acid of phosphorus having a $P_2O_5$ content of from about 79 to about 85 weight percent, said mixture having been calcined at a temperature in the range of from about 550° to about 900° C., said catalyst containing a mole ratio of $P_2O_5$ to $SiO_2$ in the range of from about 1.0 to about 1.5, and recovering the resultant cumene.

11. A process for the alkylation of toluene which comprises condensing toluene with propylene at a temperature in the range of from about room temperature to about 400° C. and at a pressure in the range of from about atmospheric to about 100 atmospheres in the presence of a catalyst consisting of a mixture of from about 25 to about 18% by weight of a siliceous adsorbent and from about 75 to about 82% by weight of an oxygen acid of phosphorus having a $P_2O_5$ content of from about 79 to about 85 weight percent, said mixture having been calcined at a temperature in the range of from about 550° to about 900° C., said catalyst containing a mole ratio of $P_2O_5$ to $SiO_2$ in the range of from about 1.0 to about 1.5, and recovering the resultant cymene.

12. A process for the alkylation of benzene which comprises condensing benzene with a mixture of ethylene and propylene at a temperature in the range of from about room temperature to about 400° C. and at a pressure in the range of from about atmospheric to about 100 atmospheres in the presence of a catalyst consisting of a mixture of from about 25 to about 18% by weight of a siliceous adsorbent and from about 75 to about 82% by weight of an oxygen acid of phosphorus having a $P_2O_5$ content of from about 79 to about 85 weight percent, said mixture having been calcined at a temperature in the range of from about 550° to about 900° C., said catalyst containing a mole ratio of $P_2O_5$ to $SiO_2$ in the range of from about 1.0 to about 1.50, and recovering the resultant ethylbenzene and cumene.

References Cited by the Examiner

UNITED STATES PATENTS

| | | | |
|---|---|---|---|
| 2,018,065 | 10/35 | Ipatieff et al. | 260—671 |
| 2,275,182 | 3/42 | Ipatieff et al. | 260—671 |
| 2,375,041 | 5/45 | Schmerling | 260—671 |
| 2,569,092 | 9/51 | Deering | 260—671 |
| 2,575,457 | 11/51 | Mavity | 260—671 |
| 2,580,647 | 1/52 | Bielawski | 260—671 |
| 2,584,102 | 2/52 | Mavity | 260—671 |
| 2,833,727 | 5/58 | Mavity et al. | 260—624 X |
| 2,843,640 | 7/58 | Langlois et al. | 260—671 |

FOREIGN PATENTS

| | | |
|---|---|---|
| 951,355 | 4/49 | France. |
| 769,383 | 3/57 | Great Britain. |

ALPHONSO D. SULLIVAN, *Primary Examiner.*

CHARLES B. PARKER, *Examiner.*